(12) United States Patent
Yin et al.

(10) Patent No.: US 8,467,459 B2
(45) Date of Patent: Jun. 18, 2013

(54) METHOD AND APPARATUS FOR COMPLEXITY SCALABLE VIDEO ENCODING AND DECODING

(75) Inventors: Peng Yin, West Windsor, NJ (US); Jill MacDonald Boyce, Manalapan, NJ (US); Purvin Bibhas Pandit, Somserset, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1438 days.

(21) Appl. No.: 11/665,302

(22) PCT Filed: Oct. 12, 2005

(86) PCT No.: PCT/US2005/036511
§ 371 (c)(1),
(2), (4) Date: Apr. 12, 2007

(87) PCT Pub. No.: WO2006/044370
PCT Pub. Date: Apr. 27, 2006

(65) Prior Publication Data
US 2007/0286283 A1    Dec. 13, 2007

Related U.S. Application Data

(60) Provisional application No. 60/618,254, filed on Oct. 13, 2004.

(51) Int. Cl.
*H04N 7/12*     (2006.01)
*H04N 7/36*     (2006.01)
*H04N 11/02*    (2006.01)
*H04N 11/04*    (2006.01)
*H04N 7/26*     (2006.01)
*H04N 7/24*     (2006.01)
*H04N 7/32*     (2006.01)
*H04N 7/50*     (2006.01)

(52) U.S. Cl.
USPC ............ 375/240.29; 375/240.12; 375/240.16; 375/240.25; 375/240.26

(58) Field of Classification Search
USPC ............ 375/240.29, 240.16, 240.25, 240.26, 375/240.12
See application file for complete search history.

(56) References Cited

U.S. PATENT DOCUMENTS 4,651,206 A * 3/1987 Ohki ................. 375/240.16
6,301,304 B1 * 10/2001 Jing et al. .......... 375/240.25
(Continued)

FOREIGN PATENT DOCUMENTS

EP          2051525 A1 *   4/2009
WO     WO2005099276         10/2005

OTHER PUBLICATIONS

Fulvio Babich, Marco D'orlando, Francesca Vatta; "Video quality estimation in wireless IP networks: Algorithms and applications"; Jan. 2008; Transactions on Multimedia Computing, Communications, and Applications (TOMCCAP), vol. 4 Issue 1; Publisher: ACM; pp. 1-18.*

(Continued)

*Primary Examiner* — Nirav B Patel
*Assistant Examiner* — Courtney Fields
(74) *Attorney, Agent, or Firm* — Robert D. Shedd; Guy H. Eriksen

(57) ABSTRACT

There are provided scalable complexity video decoder and encoders for respectively decoding and encoding a video bitstream. A scalable complexity video decoder includes a first combiner, a second combiner, and a deblocking filter. The first combiner is for combining full resolution motion compensated predictions and decoded upsampled base layer residuals to form reconstructed upsampled base layer pictures for display without any deblocking operations applied thereto. The second combiner, in signal communication with the first combiner, is for combining the reconstructed upsampled base layer pictures with decoded enhancement layer residuals to form reconstructed full resolution enhancement layer pictures. The deblocking filter, in signal communication with the second combiner, is for performing deblocking operations on only the reconstructed full resolution enhancement layer pictures to output filtered reconstructed full resolution enhancement layer pictures for display.

20 Claims, 14 Drawing Sheets

U.S. PATENT DOCUMENTS

| | | | |
|---|---|---|---|
| 6,631,163 B1 | 10/2003 | Peng | |
| 6,704,362 B2 | 3/2004 | Peng et al. | |
| 2002/0191698 A1* | 12/2002 | Lee et al. | 375/240.12 |
| 2006/0146934 A1* | 7/2006 | Caglar et al. | 375/240.12 |
| 2008/0304567 A1* | 12/2008 | Boyce et al. | 375/240.16 |

OTHER PUBLICATIONS

, Cote', G. et al. "H.263+: Video coding at low bit rates"vol. 8, No. 7, Nov. 1998, pp. 849-866, XP011014514.

, ITU-T Recommendation H. 263: "Video coding for low bit rate communication", Series H: Audiovisual and Multimedia System, Feb. 1998, pp. 1-155, XP002176560.

, Tourapis, A. et al. "New Results on Reduced Resolution Update Mode", ITU-T Video Coding Experts Group (ITU-T SG16 Q.6), Document VCEG-W04, Jul. 19, 2004, pp. 1-15, XP002363149.

, Tourapis, A. et al: "Reduced Resolution Update Mode for Advanced Video Coding", ITU-T Video Coding Experts Group (ITU-T SG16 Q.6), Document: VCEG-V05, Mar. 15, 2004, pp. 1-15, XP002363150.

, Wiegand, T.: "Text of Final Committee Draft of Joint Video Specification (ITU-T Rec. H.264/ISO/IEC 14496-10 AVC), MPEG02/N4920" Jul. 2002, pp. I-XV and 1-197, XP001100641.

International Search Report, dated Feb. 28, 2006.

Sullivan, Gary, "Draft Text of Recommendation H.263 Version 2", Study Group 18—Contribution COM-999. Question: 15/16, International Telecommunications Union, Telecommication Standardization Sector, Study Period 1997-2000, COM 99-E.

Schwartz, H. et al., "Scalable Extension of H.264/AVC Proposal", ISO/IEC JTC1/SC29/WG11MPEG04/M10569, Mar. 2004, URL, http://ip.hhl.de/Imagecom_G1/assets/pdfs/m10569_2004.pdf.

* cited by examiner

*FIG. 14*

| *FIG. 14A* |
| *FIG. 14B* |
| *FIG. 14C* |
| *FIG. 14D* |

| slice_header( ) { | C | Descriptor |
|---|---|---|
|   first_mb_in_slice | 2 | ue(v) |
|   slice_type | 2 | ue(v) |
|   pic_parameter_set_id | 2 | ue(v) |
|   frame_num | 2 | u(v) |
| /*Reduced Resolution Update parameters */ | | |
|   reduced_resolution_update | 2 | u(1) |
|   if (reduced_resolution_update) { | | |
|     low_width_scale_ | 2 | ue(v) |
|     low_height_scale | 2 | ue(v) |
|   } | | |
| /* complexity scalability parameters*/ | | |
|   complexity_scalable_enable | 2 | u(1) |
|   if (complexity_scalable_enable) { | | |
|     enhancement_layer_flag | 2 | u(1) |
|     if (!enhancement_layer_flag) | | |
|     { | | |
|       low_width_scale | 2 | ue(v) |
|       low_height_scale | 2 | ue(v) |
|     } | | |
|   } | | |
| /* End of Complexity Scalable Parameters */ | | |
|   if (!frame_mbs_only_flag) { | | |
|     field_pic_flag | 2 | u(1) |
|     if (field_pic_flag) | | |
|       bottom_field_flag | 2 | u(1) |
|   } | | |
|   if (nal_unit_type == 5) | | |
|     idr_pic_id | 2 | ue(v) |
|   if (pic_order_cnt_type == 0) { | | |
|     pic_order_cnt_lsb | 2 | u(v) |
|     if (pic_order_present_flag && !field_pic_flag) | | |
|       delta_pic_order_cnt_bottom | 2 | se(v) |
|   } | | |
|   if (pic_order_cnt_type == 1 && !delta_pic_order_always_zero_flag) { | | |
|     delta_pic_order_cnt[ 0 ] | 2 | se(v) |
|     if (pic_order_present_flag && !field_pic_flag) | | |
|       delta_pic_order_cnt[ 1 ] | 2 | se(v) |

FIG. 14B

| | | |
|---|---|---|
| } | | |
| if (redundant_pic_cnt_present_flag) | | |
|     redundant_pic_cny | 2 | ue(v) |
| if (slice_type == B) | | |
|     direct_spatial_mv_pred_flag | 2 | u(1) |
| if (slice_type == P \|\| slice_type == SP \|\| slice_type == B) { | | |
|     num_ref_idx_active_override_flag | 2 | u(1) |
|     if (num_ref_idx_active_override_flag) { | | |
|         num_ref_idx_l0_active_minus1 | 2 | ue(v) |
|         if (slice_type == B) | | |
|             num_ref_idx_l1_active_minus1 | 2 | ue(v) |
|     } | | |
| } | | |
| ref_pic_list_reordering( ) | 2 | |
| if ( (weighted_pred_flag && (slice_type == P \|\| slice_type == SP) ) \|\| (weighted_bipred_idc == 1 && slice_type == B ) ) | | |
|     pred_weight_table( ) | 2 | |
| if (nal_ref_idc != 0) | | |
|     dec_ref_pic_marking ( ) | 2 | |
| if (entropy_coding_mode_flag && slice_type != I && slice_type != SI) | | |
|     cabac_init_idc | 2 | ue(v) |
| slice_qp_delta | 2 | se(v) |
| if (slice_type == SP \|\| slice_type == SI) { | | |
|     if (slice_type == SP) | | |
|         sp_for_switch_flag | 2 | u(1) |
|     slice_qs_delta | 2 | se(v) |
| } | | |
| if (deblocking_filter_control_present_flag) { | | |
|     disable_deblocking_filter_idc | 2 | ue(v) |
|     if (disable_deblocking_filter_idc != 1) { | | |
|         slice_alpha_c0_offset_div2 | 2 | se(v) |
|         slice_beta_offset_div2 | 2 | se(v) |
|     } | | |
| } | | |
| if (num_slice_groups_minus1 > 0 && slice_group_map_type >= 3 && slice_group_map_type <= 5) | | |
|     slice_group_change_cycle | 2 | u(v) |
| } | | |

| slice_header ( ) { | C | Descriptor |
|---|---|---|
| first_mb_in_slice | 2 | ue(v) |
| slice_type | 2 | ue(v) |
| pic_parameter_set_id | 2 | ue(v) |
| frame_num | 2 | u(v) |
| /* Reduced Resolution Update parameters */ | | |
| reduced_resolution_update | 2 | u(1) |
| /* complexity scalability parameters*/ | | |
| complexity_scalable_enable | 2 | u(1) |
| if (complexity_scalable_enable) { | | |
| enhancement_layer_flag | 2 | u(1) |
| } | | |
| /* End of Complexity Scalable Parameters */ | | |
| if (!frame_mbs_only_flag) { | | |
| field_pic_flag | 2 | u(1) |
| if (field_pic_flag) | | |
| bottom_field_flag | 2 | u(1) |
| } | | |
| if (nal_unit_type == 5) | | |
| idr_pic_id | 2 | ue(v) |
| if (pic_order_cnt_type == 0) { | | |
| pic_order_cnt_lsb | 2 | u(v) |
| if (pic_order_present_flag && !field_pic_flag) | | |
| delta_pic_order_cnt_bottom | 2 | se(v) |
| } | | |
| if (pic_order_cnt_type == 1 && !delta_pic_order_always_zero_flag) { | | |
| delta_pic_order_cnt[ 0 ] | 2 | se(v) |
| if (pic_order_present_flag && !field_pic_flag) | | |
| delta_pic_order_cnt[ 1 ] | 2 | se(v) |
| } | | |
| if (redundant_pic_cnt_present_flag) | | |
| redundant_pic_cnt | 2 | ue(v) |
| if (slice_type == B) | | |
| direct_spatial_mv_pred_flag | 2 | u(1) |
| if (slica_type == P || slice_type == SP || slice_type == B) { | | |
| num_ref_idx_active_override_flag | 2 | u(1) |
| if (num_ref_idx_active_override_flag) { | | |
| num_ref_idx_l0_active_minus1 | 2 | ue(v) |

| | | |
|---|---|---|
| if (slice_type == B) | | |
|     num_ref_idx_l1_active_minus1 | 2 | ue(v) |
|   } | | |
| } | | |
| ref_pic_list_reordering( ) | 2 | |
| if (weighted_pred_flag && (slice_type == P \|\| slice_type == SP) ) \|\| <br>    (weighted_bipred_idc == 1 && slice_type == B) ) | | |
|   pred_weight_table( ) | 2 | |
| if (nal_ref_idc != 0) | | |
|   dec_ref_pic_marking( ) | 2 | |
| if (entropy_coding_mode_flag && slice_type != I && slice_type != SI) | | |
|   cabac_init_idc | 2 | ue(v) |
| slice_qp_delta | 2 | se(v) |
| if (slice_type == SP \|\| slice_type == SI) { | | |
|   if (slice_type == SP) | | |
|     sp_for_switch_flag | 2 | u(1) |
|   slice_qs_delta | 2 | se(v) |
| } | | |
| if (deblocking_filter_control_ present_flag) { | | |
|   disable_deblocking_filter_idc | 2 | ue(v) |
|   if (disable_deblocking_filter_idc != 1) { | | |
|     slice_alpha_c0_offset_div2 | 2 | se(v) |
|     slice_beta_offset_div2 | 2 | se(v) |
|   } | | |
| } | | |
| if (num_slice_groups_minus1 > 0 && <br>    slice_group_map_type >= 3 && slice_group_map_type <= 5) | | |
|   slice_group_change_cycle | 2 | u(v) |
| } | | |

| nal_unit_type | Content of NAL unit and RBSP syntax structure | C |
|---|---|---|
| 0 | Unspecified | |
| 1 | Coded slice of a non-IDR picture slice_layer_witout_partitioning_rbsp( ) | 2, 3, 4 |
| 2 | Coded slice data partition A slice_data_partition_a_layer_rbsp( ) | 2 |
| 3 | Coded slice data partition B slice_data_partition_b_layer_rbsp( ) | 3 |
| 4 | Coded slice data partition C slice_data_partition_c_layer_rbsp( ) | 4 |
| 5 | Coded slice of an IDR picture slice_layer_without_parttioning_rbsp( ) | 2, 3 |
| 6 | Supplemental enhancement information (SEI) sei_rbsp( ) | 5 |
| 7 | Sequence parameter set seq_parameter_set_rbsp( ) | 0 |
| 8 | Picture parameter set pic_parameter_set_rbsp( ) | 1 |
| 9 | Access unit delimiter access_unit_delimiter_rbsp( ) | 6 |
| 10 | End of sequence end_of_seq_rbsp( ) | 7 |
| 11 | End of stream end_of_stream_rbsp( ) | 8 |
| 12 | Filler data filler_data_rbsp( ) | 9 |
| 13 | Coded slice of an enhancement layer | 2, 3, 4 |
| 14..23 | Reserved | |
| 24..31 | Unspecified | |

*FIG. 15*

METHOD AND APPARATUS FOR COMPLEXITY SCALABLE VIDEO ENCODING AND DECODING

CROSS-REFERENCE TO RELATED APPLICATIONS

This application claims the benefit, under 35 U.S.C. §365 of International Application PCT/US2005/036511, filed Oct. 12, 2005, which was published in accordance with PCT Article 21(2) on Apr. 27, 2006 in English and claims priority of 60/618,254 filed Oct. 13, 2004.

FIELD OF THE INVENTION

The present invention relates generally to video encoding and decoding and, more particularly, to a method and apparatus for scalable complexity video encoding and decoding.

BACKGROUND OF THE INVENTION

It is desirable for a broadcast video application to provide support for diverse user devices, without incurring the bitrate penalty of simulcast encoding. Video decoding is a complex operation, and the complexity is very dependent on the resolution of the coded video. Low power portable devices typically have very strict complexity restrictions and low resolution displays. Simulcast broadcasting of two or more video bitstreams corresponding to different resolutions can be used to address the complexity requirements of the lower resolution devices, but requires a higher total bitrate than a complexity scalable system in accordance with the present invention. Accordingly, there is a need for a solution that allows for complexity scalable decoders while maintaining high video coding bitrate efficiency.

Many different methods of scalability have been widely studied and standardized, including SNR scalability, spatial scalability, temporal scalability, and fine grain scalability, in scalability profiles of the MPEG-2 and MPEG-4 standards. Most of the work in scalable coding has been aimed at bitrate scalability, where the low resolution layer has a limited bandwidth. As shown in FIG. 1, a typical spatial scalability system is indicated generally by the reference numeral 100. The system 100 includes a complexity scalable video encoder 110 for receiving a video sequence. A first output of the complexity scalable video encoder 110 is connected in signal communication with a low bandwidth network 120 and with a first input of a multiplexer 130. A second output of the complexity scalable video encoder 110 is connected in signal communication with a second input of the multiplexer 130. An output of the low bandwidth network 120 is connected in signal communication with an input of a low resolution decoder 140. An output of the multiplexer 130 is connected in signal communication with an input of a high bandwidth network 150. An output of the high bandwidth network 150 is connected in signal communication with an input of a demultiplexer 160. A first output of the demultiplexer 160 is connected in signal communication with a first input of a high resolution decoder 170, and a second output of the demultiplexer 160 is connected in signal communication with a second input of the high resolution decoder 170. An output of the low-resolution decoder 140 is available as an output of the system 100 for a base layer bitstream, and an output of the high-resolution decoder 170 is available as an output of the system 100 for a scalable bitstream.

Scalable coding has not been widely adopted in practice, because of the considerable increase in encoder and decoder complexity, and because the coding efficiency of scalable encoders is typically well below that of non-scalable encoders.

Spatially scalable encoders and decoders typically require that the high resolution scalable encoder/decoder provide additional functionality than would be present in a normal high resolution encoder/decoder. In an MPEG-2 spatial scalable encoder, a decision is made whether prediction is performed from a low resolution reference picture or from a high resolution reference picture. An MPEG-2 spatial scalable decoder must be capable of predicting either from the low resolution reference picture or the high resolution reference picture. Two sets of reference picture stores are required by an MPEG-2 spatial scalable encoder/decoder, one for low resolution pictures and another for high resolution pictures. FIG. 2 shows a block diagram for a low-complexity spatial scalable encoder 200 supporting two layers, according to the prior art. FIG. 3 shows a block diagram for a low-complexity spatial scalable decoder 300 supporting two layers, according to the prior art.

Turning to FIG. 2, a spatial scalable video encoder supporting two layers is indicated generally by the reference numeral 200. The video encoder 200 includes a downsampler 210 for receiving a high-resolution input video sequence. The downsampler 210 is coupled in signal communication with a low-resolution non-scalable encoder 212, which, in turn, is coupled in signal communication with low-resolution frame stores 214. The low-resolution non-scalable encoder 212 outputs a low-resolution bitstream, and is further coupled in signal communication with a low-resolution non-scalable decoder 220.

The low-resolution non-scalable decoder 220 is coupled in signal communication with an upsampler 230, which, in turn, is coupled in signal communication with a scalable high-resolution encoder 240. The scalable high-resolution encoder 240 also receives the high-resolution input video sequence, is coupled in signal communication with high-resolution frame stores 250, and outputs a high-resolution scalable bitstream. An output of the low-resolution non-scalable encoder 212 and an output of the scalable high-resolution encoder are available as outputs of the spatial scalable video encoder 200.

Thus, a high resolution input video sequence is received by the low-complexity encoder 200 and down-sampled to create a low-resolution video sequence. The low-resolution video sequence is encoded using a non-scalable low-resolution video compression encoder, creating a low-resolution bitstream. The low-resolution bitstream is decoded using a non-scalable low-resolution video compression decoder. This function may be performed inside of the encoder. The decoded low-resolution sequence is up-sampled, and provided as one of two inputs to a scalable high-resolution encoder. The scalable high-resolution encoder encodes the video to create a high-resolution scalable bitstream.

Turning to FIG. 3, a spatial scalable video decoder supporting two layers is indicated generally by the reference numeral 300. The video decoder 300 includes a low-resolution decoder 360 for receiving a low-resolution bitstream, which is coupled in signal communication with low-resolution frame stores 362, and outputs a low-resolution video sequence. The low-resolution decoder 360 is further coupled in signal communication with an upsampler 370, which, in turn, is coupled in signal communication with a scalable high-resolution decoder 380.

The scalable high-resolution decoder 380 is further coupled in signal communication with high-resolution frame stores 390. The scalable high-resolution decoder 380 receives a high-resolution scalable bitstream and outputs a high-resolution video sequence. An output of the low-resolution decoder 360 and an output of the scalable high-resolution decoder are available as outputs of the spatial scalable video decoder 300.

Thus, both a high-resolution scalable bitstream and low-resolution bitstream are received by the low-complexity decoder 300. The low-resolution bitstream is decoded using a non-scalable low-resolution video compression decoder, which utilizes low-resolution frame stores. The decoded low-resolution video is up-sampled, and then input into a high-resolution scalable decoder. The high-resolution scalable decoder utilizes a set of high-resolution frame stores, and creates the high-resolution output video sequence.

Turning to FIG. 4, a non-scalable video encoder is indicated generally by the reference numeral 400. An input to the video encoder 400 is connected in signal communication with a non-inverting input of a summing junction 410. The output of the summing junction 410 is connected in signal communication with a transformer/quantizer 420. The output of the transformer/quantizer 420 is connected in signal communication with an entropy coder 440. An output of the entropy coder 440 is available as an output of the encoder 400.

The output of the transformer/quantizer 420 is further connected in signal communication with an inverse transformer/quantizer 450. An output of the inverse transformer/quantizer 450 is connected in signal communication with an input of a deblock filter 460. An output of the de block filter 460 is connected in signal communication with reference picture stores 470. A first output of the reference picture stores 470 is connected in signal communication with a first input of a motion estimator 480. The input to the encoder 400 is further connected in signal communication with a second input of the motion estimator 480. The output of the motion estimator 480 is connected in signal communication with a first input of a motion compensator 490. A second output of the reference picture stores 470 is connected in signal communication with a second input of the motion compensator 490. The output of the motion compensator 490 is connected in signal communication with an inverting input of the summing junction 410.

Turning to FIG. 5, a non-scalable video decoder is indicated generally by the reference numeral 500. The video decoder 500 includes an entropy decoder 510 for receiving a video sequence. A first output of the entropy decoder 510 is connected in signal communication with an input of an inverse quantizer/transformer 520. An output of the inverse quantizer/transformer 520 is connected in signal communication with a first input of a summing junction 540.

The output of the summing junction 540 is connected in signal communication with a deblock filter 590. An output of the deblock filter 590 is connected in signal communication with reference picture stores 550. The reference picture stores 550 is connected in signal communication with a first input of a motion compensator 560. An output of the motion compensator 560 is connected in signal communication with a second input of the summing junction 540. A second output of the entropy decoder 510 is connected in signal communication with a second input of the motion compensator 560. The output of the deblock filter 590 is available as an output of the video decoder 500.

It has been proposed that H.264/MPEG AVC be extended to use a Reduced Resolution Update (RRU) mode. The RRU mode improves coding efficiency at low bitrates by reducing the number of residual macroblocks (MBs) to be coded, while performing motion estimation and compensation of full resolution pictures. Turning to FIG. 6, a Reduced Resolution Update (RRU) video encoder is indicated generally by the reference numeral 600. An input to the video encoder 600 is connected in signal communication with a non-inverting input of a summing junction 610. The output of the summing junction 610 is connected in signal communication with an input of a downsampler 612. An input of a transformer/quantizer 620 is connected in signal communication with an output of the downsampler 612 or with the output of the summing junction 610. An output of the transformer/quantizer 620 is connected in signal communication with an entropy coder 640. An output of the entropy coder 640 is available as an output of the video encoder 600.

The output of the transformer/quantizer 620 is further connected in signal communication with an input of an inverse transformer/quantizer 650. An output of the inverse transformer/quantizer 650 is connected in signal communication with an input of an upsampler 655. An input of a deblock filter 660 is connected in signal communication with an output of the inverse transformer/quantizer 650 or with an output of the upsampler 655. An output of the deblock filter 660 is connected in signal communication with an input of reference picture stores 670. A first output of the reference picture stores 670 is connected in signal communication with a first input of a motion estimator 680. The input to the encoder 600 is further connected in signal communication with a second input of the motion estimator 680. The output of the motion estimator 680 is connected in signal communication with a first input of a motion compensator 690. A second output of the reference picture stores 670 is connected in signal communication with a second input of the motion compensator 690. The output of the motion compensator 690 is connected in signal communication with an inverting input of the summing junction 610.

Turning to FIG. 7, a Reduced Resolution Update (RRU) video decoder is indicated generally by the reference numeral 700. The video decoder 700 includes an entropy decoder 710 for receiving a video sequence. An output of the entropy decoder 710 is connected in signal communication with an input of an inverse quantizer/transformer 720. An output of the inverse quantizer/transformer 720 is connected in signal communication with an input of an upsampler 722. An output of the upsampler 722 is connected in signal communication with a first input of a summing junction 740.

An output of the summing junction 740 is connected in signal communication with a deblock filter 790. An output of the deblock filter 790 is connected in signal communication with an input of full resolution reference picture stores 750. The output of the deblock filter 790 is also available as an output of the video decoder 700. An output of the full resolution reference picture stores 750 is connected in signal communication with a motion compensator 760, which is connected in signal communication with a second input of the summing junction 740.

It has been proposed to use RRU concept to design a complexity scalable codec. An example is provided for a system that supports two different levels of decoder complexity and resolution. A low resolution decoder has a smaller display size and has very strict decoder complexity constraints. A full resolution decoder has a larger display size and less strict but still important decoder complexity constraints. A broadcast or multicast system transmits two bitstreams, a base layer with bitrate $BR_{base}$ and an enhancement layer with bitrate $BR_{enhan}$. The two bitstreams may be multiplexed together and sent in a single transport stream. Turning to FIG. 8, a complexity scalable broadcast system is indicated generally by the reference numeral 800. The system 800 includes a complexity scalable video encoder and a low resolution decoder and a full resolution decoder. The complexity scalable broadcast system 800 includes a complexity scalable video encoder 810. A first output of the complexity scalable video encoder 810 is connected in signal communication with a first input of a multiplexer 820. A second output of the complexity scalable video encoder 810 is connected in signal communication with a second input of the multiplexer 820. An output of the multiplexer 820 is connected in signal communication with a network 830. An output of the network 830 is connected in signal communication with an input of a first demultiplexer 840 and with an input of a second demultiplexer 850. An output of the first demultiplexer 840 is connected in signal communication with an input of a low resolution decoder 850. A first output of the second demultiplexer 860 is connected in signal communication with a first input of a full resolution decoder 870. A second output of the second demultiplexer 860 is connected in signal communication with a second input of the full resolution decoder 870. An output of the low-resolution decoder 850 is available as an output of the system 800 for a base layer bitstream, and an output of the full-resolution decoder 870 is available as an output of the system 800 for a scalable bitstream.

The low-resolution decoder 850 processes only the base layer bitstream and the full resolution decoder 870 processes both the base layer bitstream and the enhancement layer bitstream. RRU is used in the base layer, which can be decoded into both low resolution and high resolution sequences with different complexity at the decoder. The enhancement layer bitstream includes a full resolution error signal, to be added to the result of decoding the base layer bitstream, which was done with full resolution motion compensation. The bitrate of the enhancement layer may end up being lower than that of the base layer, which differs from the typical spatial scalability case where the base layer bitrate is typically small compared with the enhancement layer bitrate. A full resolution error signal is not necessarily sent for every coded macroblock or slice/picture.

SUMMARY OF THE INVENTION

These and other drawbacks and disadvantages of the prior art are addressed by the present invention, which is directed to a method and apparatus for scalable complexity video encoding and decoding.

According to an aspect of the present invention, there is provided a scalable complexity video decoder for decoding a video bitstream. The video decoder includes a first combiner, a second combiner, and a deblocking filter. The first combiner is for combining full resolution motion compensated predictions and decoded upsampled base layer residuals to form reconstructed upsampled base layer pictures for display without any deblocking operations applied thereto. The second combiner, in signal communication with the first combiner, is for combining the reconstructed upsampled base layer pictures with decoded enhancement layer residuals to form reconstructed full resolution enhancement layer pictures. The deblocking filter, in signal communication with the second combiner, is for performing deblocking operations on only the reconstructed full resolution enhancement layer pictures to output filtered reconstructed full resolution enhancement layer pictures for display.

According to another aspect of the present invention, there is provided a spatial scalable video decoder for decoding a video bitstream. The video decoder includes an upsampler and a deblocking filter. The upsampler is for performing an upsampling operation on a coded prediction residual corresponding to the video bitstream to form an upsampled prediction residual. The deblocking filter is for performing a deblocking operation any one of prior and subsequent to the upsampling operation.

According to yet another aspect of the present invention, there is provided a spatial scalable video decoder for decoding a video bitstream. The video decoder includes an upsampler and a reference picture store. The upsampler is for upsampling a base layer prediction residual to form an upsampled base layer prediction residual. The reference picture store is for storing an upsampled base layer reference picture formed from the upsampled base layer prediction residual along with corresponding prior full resolution reference pictures.

According to still yet another aspect of the present invention, there is provided a spatial scalable video encoder for encoding video signal data of a plurality of pictures. The video encoder includes intra coding means and inter coding means. The intra coding means is for performing intra coding using a layered coding technique to form intra coded pictures. The inter coding means is for performing inter coding using a Reduced-Resolution Update (RRU) technique to form inter coded pictures. The inter coding means includes a downsampler for downsampling a prediction residual to form a downsampled low resolution prediction residual. The inter coding means further includes a transformer/quantizer, in signal communication with the downsampler, for coding the downsampled low resolution prediction residual.

According to a further aspect of the present invention, there is provided a scalable complexity method for decoding a video bitstream. The method includes the step of combining full resolution motion compensated predictions and decoded upsampled base layer residuals to form reconstructed upsampled base layer pictures for display without any deblocking operations applied thereto. The method further includes the step of combining the reconstructed upsampled base layer pictures with decoded enhancement layer residuals to form reconstructed full resolution enhancement layer pictures. The method also includes the step of performing deblocking operations on only the reconstructed full resolution enhancement layer pictures to output filtered reconstructed full resolution enhancement layer pictures for display.

According to a still further aspect of the present invention, there is provided a spatial scalable method for decoding a video bitstream. The method includes the step of performing an upsampling operation on a coded prediction residual corresponding to the video bitstream to form an upsampled prediction residual. The method further includes the step of performing a deblocking operation any one of prior and subsequent to the upsampling operation.

According to an additional aspect of the present invention, there is provided a spatial scalable method for decoding a video bitstream. The method includes the step of upsampling a base layer prediction residual to form an upsampled base layer prediction residual. The method further includes the step of storing an upsampled base layer reference picture formed from the upsampled base layer prediction residual along with corresponding prior full resolution reference pictures.

According to a still additional aspect of the present invention, there is provided a spatial scalable method for encoding video signal data of a plurality of pictures. The method includes the step of performing intra coding using a layered coding technique to form intra coded pictures. The method also includes the step of performing (1706) inter coding using a Reduced-Resolution Update (RRU) technique to form inter coded pictures. The inter coding step includes the step of downsampling a prediction residual to form a downsampled low resolution prediction residual. The inter coding step further includes the step of coding the downsampled low resolution prediction residual.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which:

FIG. 14 shows a table for slice header syntax in accordance with the principles of the present invention;

FIG. 15 shows a table for NAL unit type codes in accordance with the principles of the present invention;

DETAILED DESCRIPTION

Figure 1:
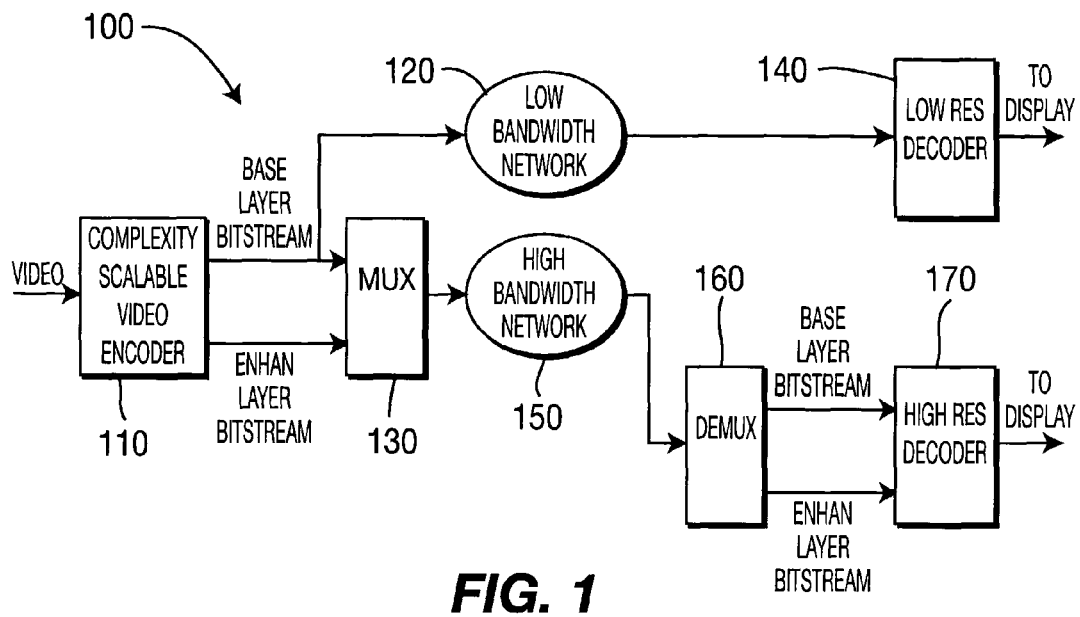
FIG. 1 shows a block diagram for a typical spatial scalability system, according to the prior art.
Figure 2:
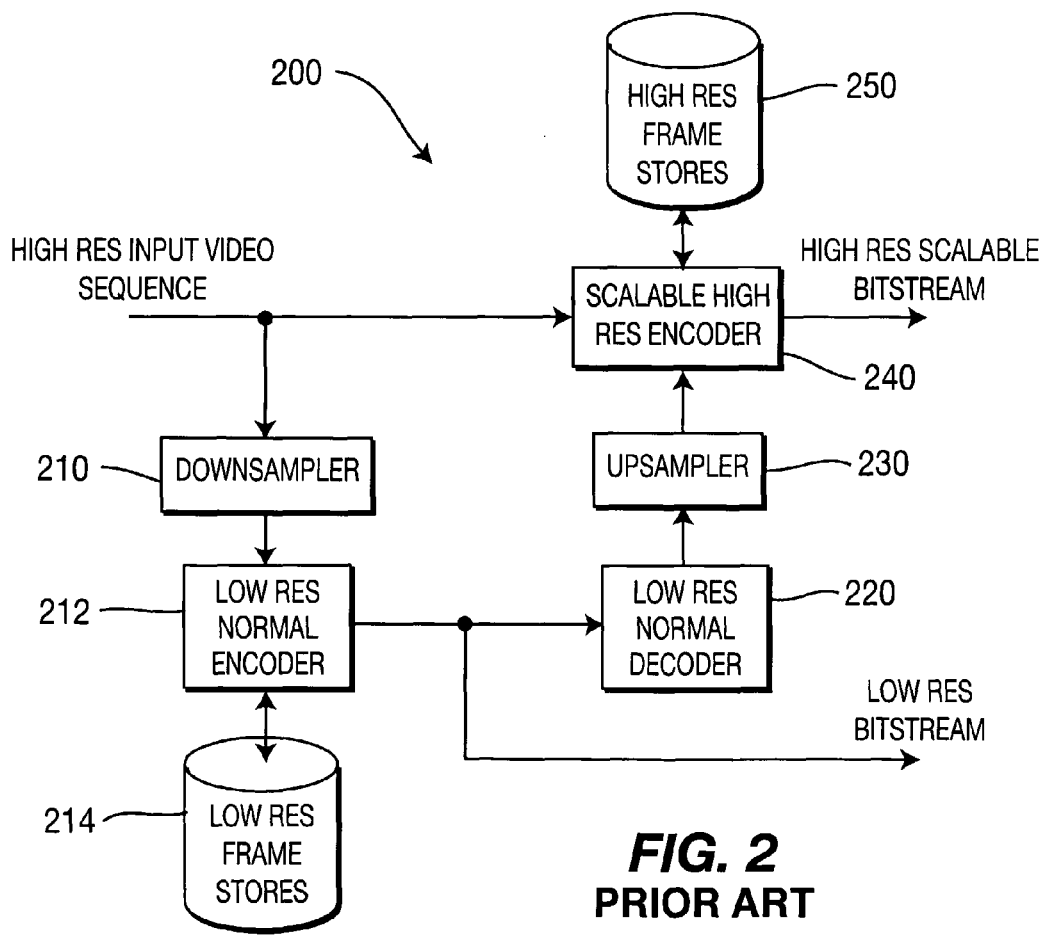
FIG. 2 shows a block diagram for a spatial scalable encoder supporting two layers, according to the prior art.
Figure 3:
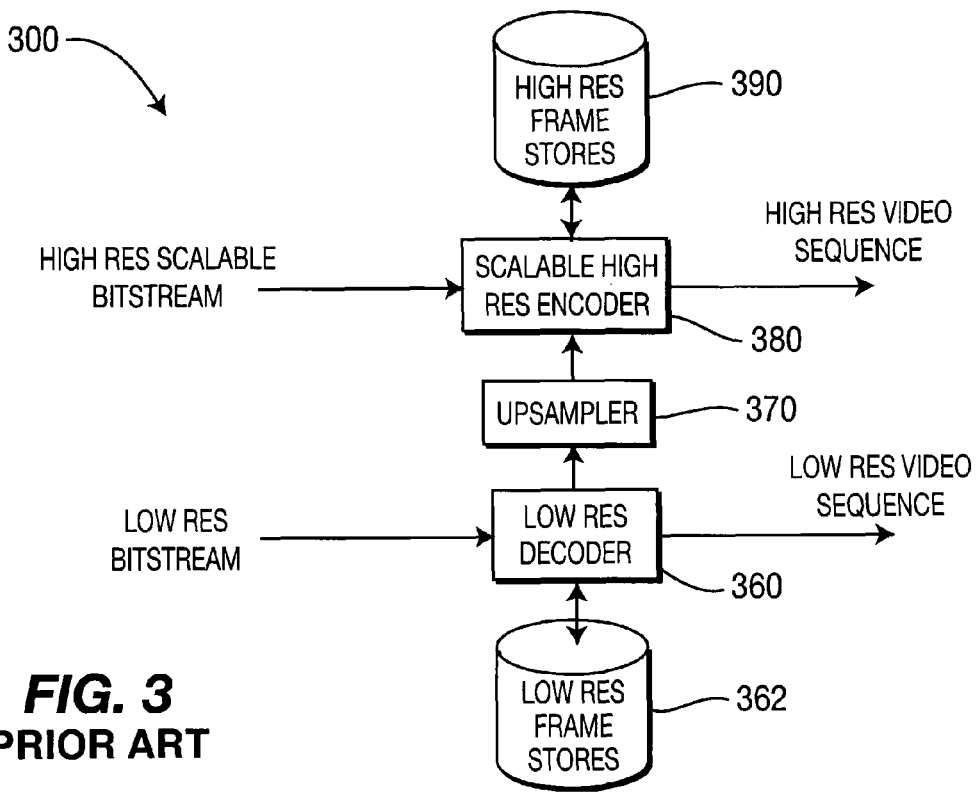
FIG. 3 shows a block diagram for a spatial scalable decoder supporting two layers, according to the prior art.
Figure 4:
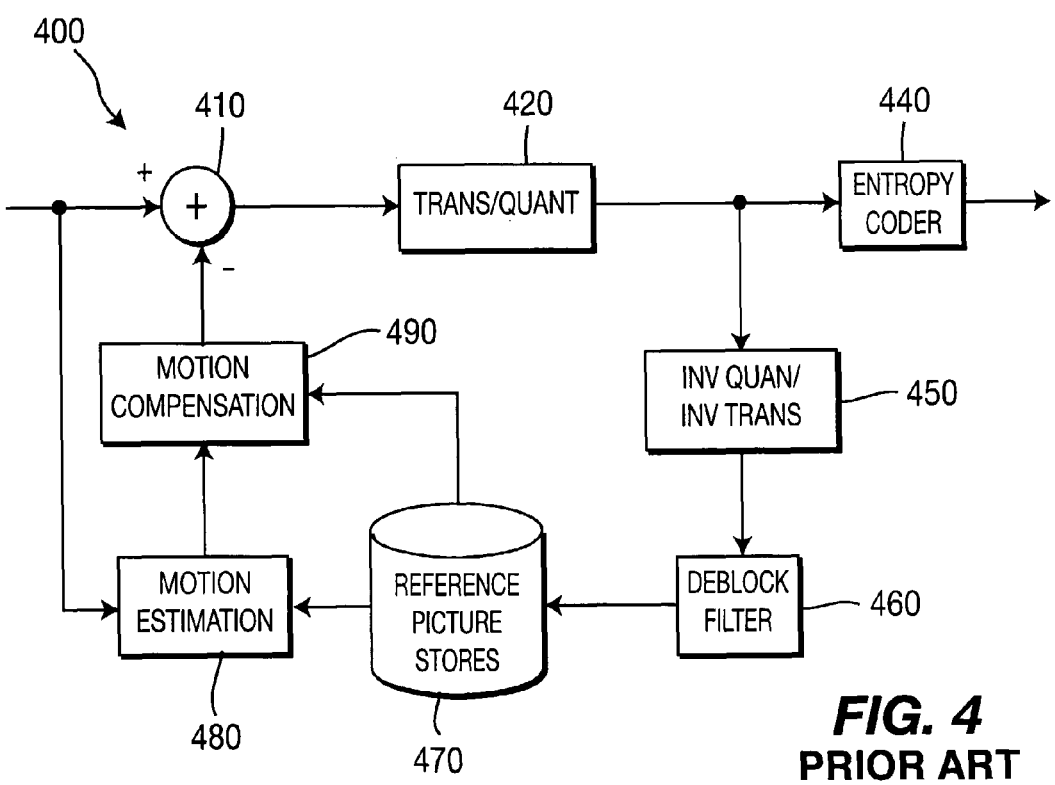
FIG. 4 shows a block diagram for a normal non-scalable video encoder used in the H.264/MPEG AVC standard, according to the prior art.
Figure 5:
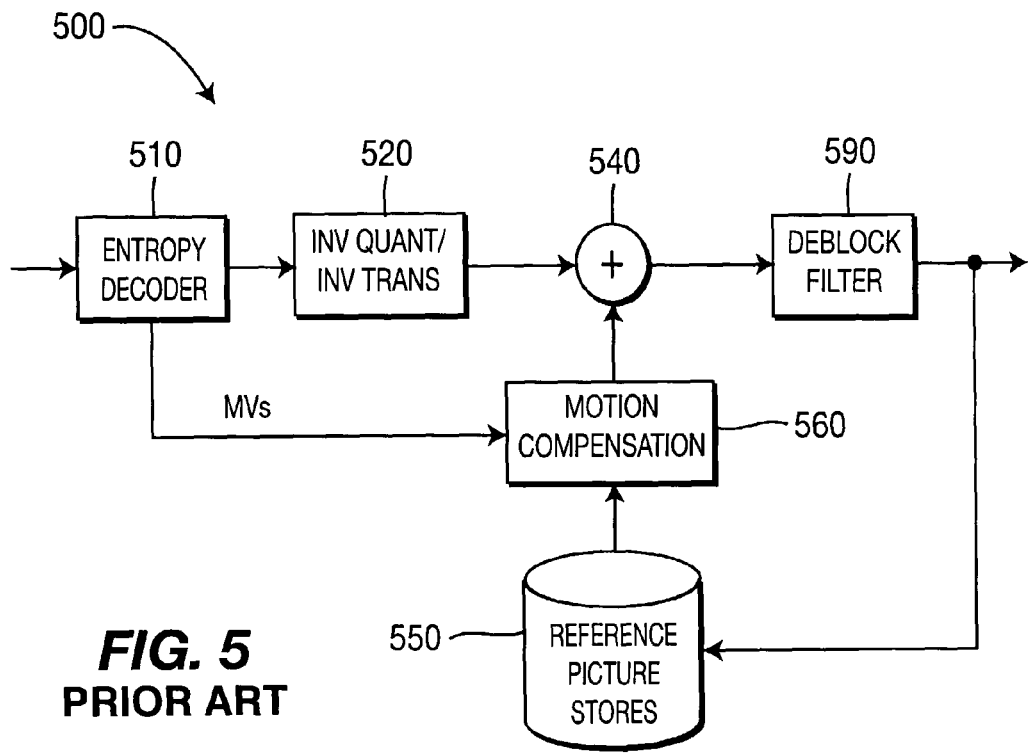
FIG. 5 shows a block diagram for a normal non-scalable video decoder used with H.264/MPEG AVC, according to the prior art.
Figure 6:
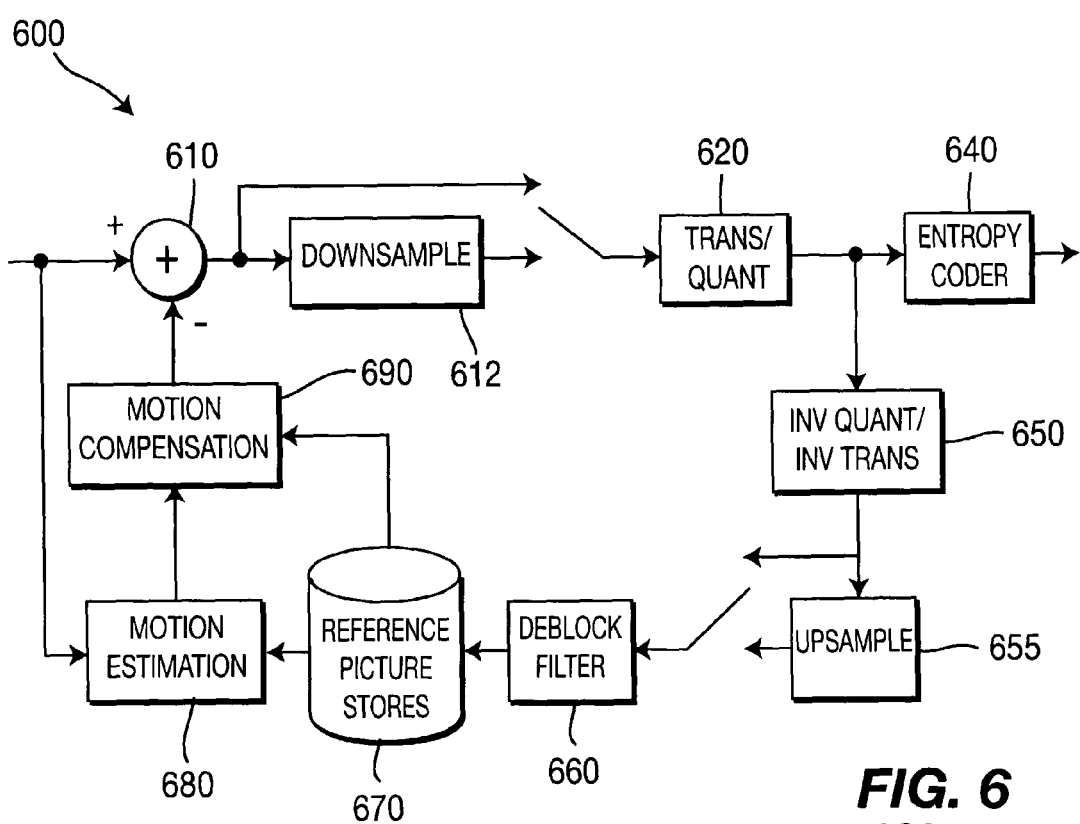
FIG. 6 shows a block diagram for a Reduced Resolution Update (RRU) video encoder, according to the prior art.
Figure 7:
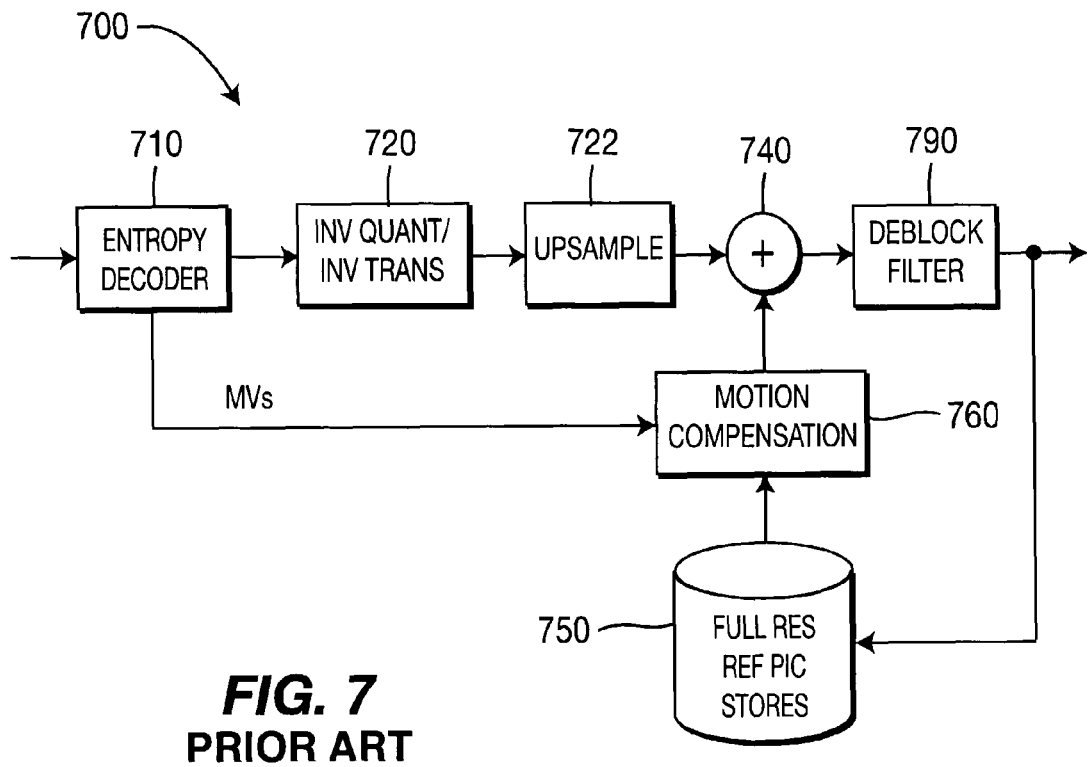
FIG. 7 shows a block diagram for a Reduced Resolution Update (RRU) video decoder, according to the prior art.

The present invention is directed to a method and apparatus for scalable complexity video encoding and decoding. In one embodiment of the present invention, the total bitrate for two or more layers is optimized while maintaining low complexity of the lowest resolution layer.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 9:
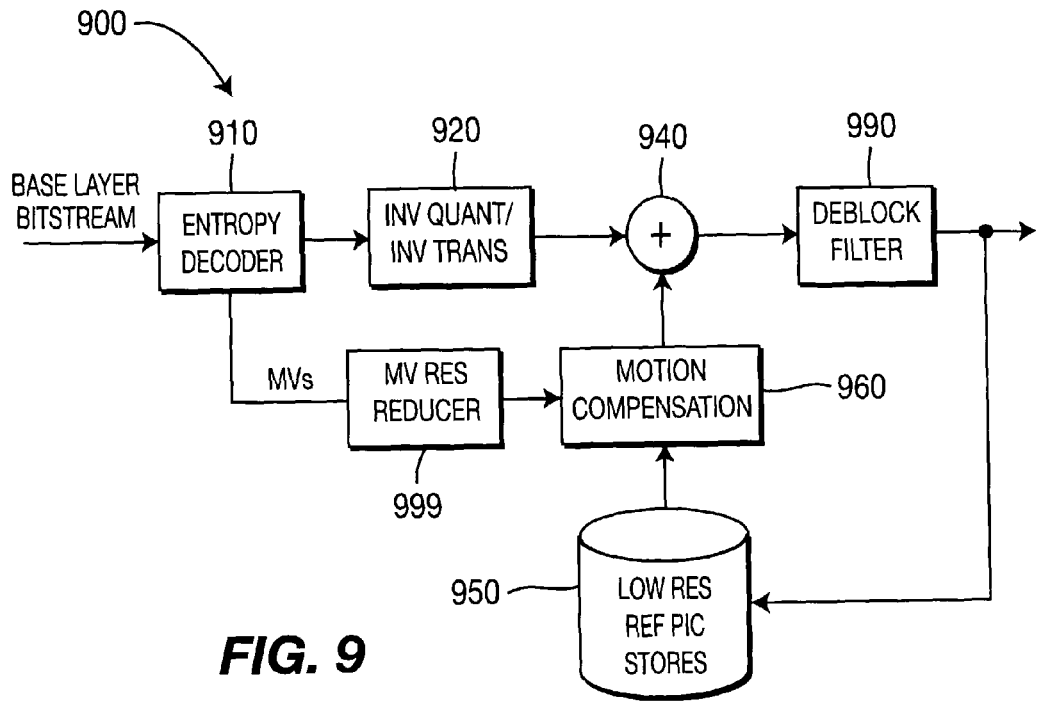
FIG. 9 shows a block diagram for a low resolution complexity scalable video decoder to which the present invention may be applied.

Turning to FIG. 9, a low resolution complexity scalable video decoder is indicated generally by the reference numeral 900. The video decoder 900 includes an entropy decoder 910 for receiving a video sequence. A first output of the entropy decoder 910 is connected in signal communication with an input of an inverse quantizer/transformer 920. An output of the inverse quantizer/transformer 920 is connected in signal communication with a first input of a summing junction 940.

The output of the summing junction 940 is connected in signal communication with a deblock filter 990. An output of the deblock filter is connected in signal communication with an input of reference picture stores 950. The output of the deblock filter 990 is also available as an output of the video decoder 900. An output of the reference picture stores 950 is connected in signal communication with a first input of a motion compensator 960. An output of the motion compensator 960 is connected in signal communication with a second input of the summing junction 940. A second output of the entropy decoder 910 is connected in signal communication with an input of a motion vector (MV) resolution reducer 999. An output of the MV resolution reducer 999 is connected in signal communication with a second input of the motion compensator 960.

In the decoder 900, the base layer bitstream is entropy decoded. The motion vectors are rounded to reduce them in accuracy to correspond to the low resolution. The complexity of this low resolution scalable decoder is very similar to that of a non-scalable decoder, as scaling of motion vectors is of very low complexity. If factors of 2 are used in the resolution ratios in each dimension between the low and full resolution, then the rounding can be implemented with just a right shift or an add and a right shift, depending whether rounding up or rounding down is selected in the system.

Figure 10:
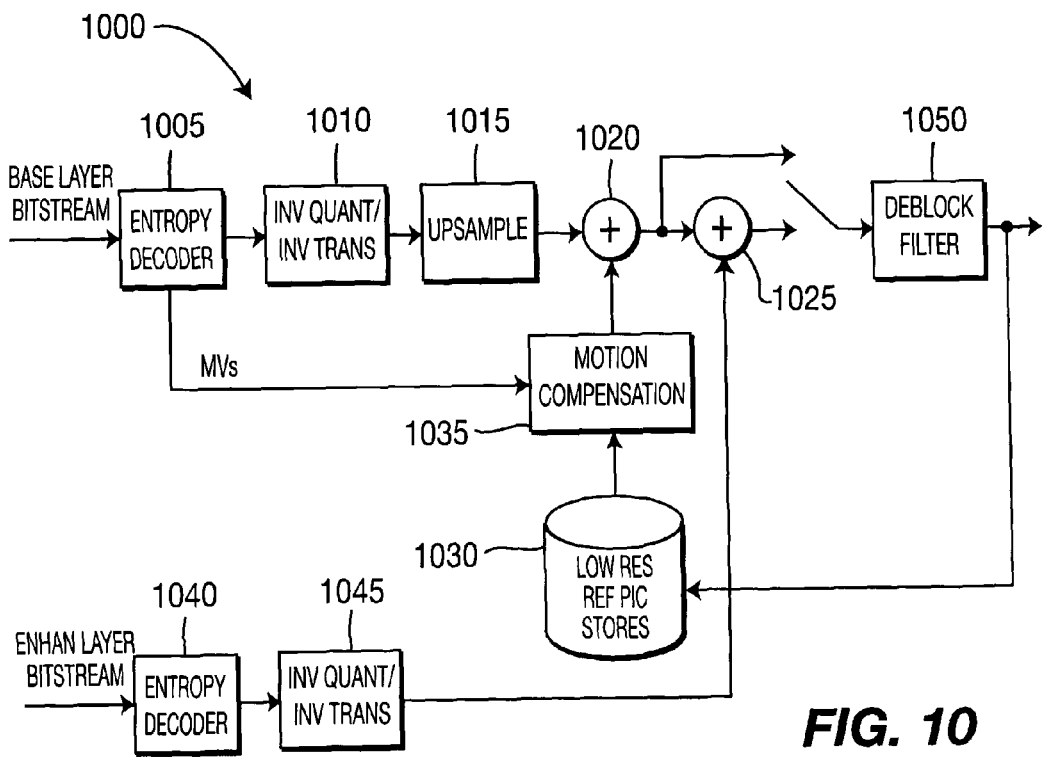
FIG. 10 shows a block diagram for a high resolution complexity scalable video decoder to which the present invention may be applied.

Turning to FIG. 10, a high resolution complexity scalable video decoder 1000 is indicated generally by the reference numeral 1000. The video decoder 1000 includes a first entropy decoder 1005 for receiving a base layer bitstream. An output of the first entropy decoder 1005 is connected in signal communication with an input of a first inverse quantizer/transformer 1010. An output of the first inverse quantizer/transformer 1010 is connected in signal communication with an input of an upsampler 1015. An output of the upsampler 1015 is connected in signal communication with a first input of a first summing junction 1020.

An output of the first summing junction 1020 is connected in signal communication with a first input of a second summing junction 1025. An output of a full resolution reference picture stores 1030 is connected in signal communication with a first input of a motion compensator 1035. A second output of the entropy decoder (for outputting motion vectors (MVs)) 1005 is connected in signal communication with a second input of the motion compensator 1035. An output of the motion compensator 1035 is connected in signal communication with a second input of the first summing junction 1020.

An input of a second entropy decoder 1040 is for receiving an enhanced layer bitstream. An output of the second entropy decoder 1040 is connected in signal communication with an input of a second inverse quantizer/transformer 1045. An output of the second inverse quantizer/transformer 1045 is connected in signal communication with a second input of the second summing junction 1025.

An input to a deblock filter 1050 is connected in signal communication with an output of the first summing junction 1020 or with an output of the second summing junction 1025. An output of the deblock filter 1050 is connected in signal communication with an input of full resolution reference picture stores 1030. The output of the deblock filter 1050 is available as an output of the video decoder 1000.

The portion of the decoder 1000 that operates on the base layer bitstream is similar to an RRU decoder. After entropy decoding and inverse quantization and inverse transform, the residual is upsampled. Motion compensation is applied to the full resolution reference pictures to form a full resolution prediction, and the upsampled residual is added to the prediction. If a full resolution error signal is present in the enhancement layer bitstream, it is entropy decoded and inversed quantized and transformed, and then added to the RRU reconstructed signal. The deblocking filter is then applied.

Figure 11:
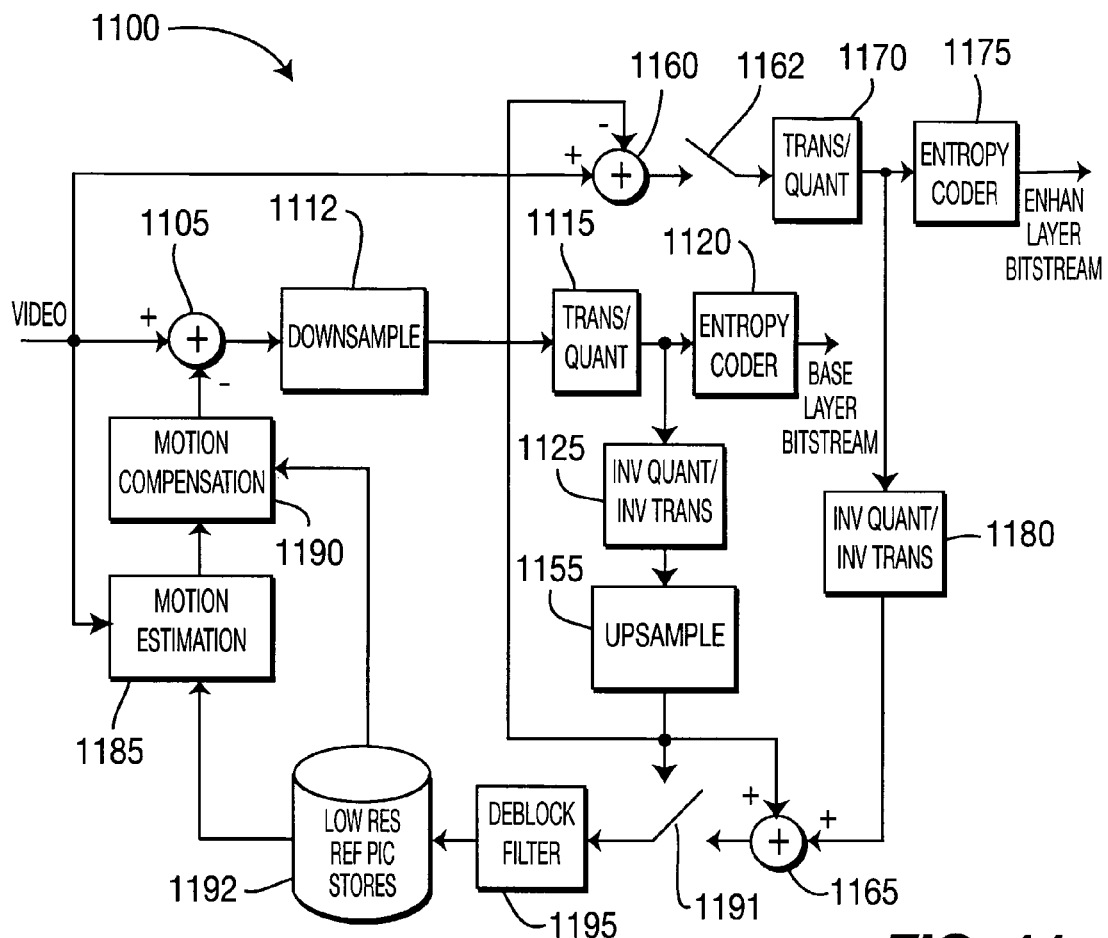
FIG. 11 shows a block diagram for a complexity scalable video encoder to which the present invention may be applied.

Turning to FIG. 11, a complexity scalable video encoder is indicated generally by the reference numeral 1100. An input to the video encoder 1100 is connected in signal communication with a non-inverting input of a first summing junction 1105. The output of the first summing junction 1105 is connected in signal communication with an input of a downsampler 1112. An output of the downsampler 1112 is connected in signal communication with an input of a first transformer/quantizer 1115. An output of the first transformer/quantizer 1115 is connected in signal communication with an input of a first entropy coder 1120. An output of the first entropy coder 1120 is available as an output of the encoder 1100 for a base layer bitstream.

The output of the first transformer/quantizer 1115 is further connected in signal communication with an input of a first inverse transformer/quantizer 1125. An output of the first inverse transformer/quantizer 1125 is connected in signal communication with an input of an upsampler 1155. An output of the upsampler 1155 is connected in signal communication with an inverting input of a second summing junction 1160 and with a first non-inverting input of a third summing junction 1165.

The input to the video encoder 1100 is further connected in signal communication with a non-inverting input of a second summing junction 1160. An output of the second summing junction 1160 is connected in signal communication with an input of a switch 1162. An output of the switch 1162 is connected in signal communication with an input to a second transformer/quantizer 1170. An output of the second transformer/quantizer 1170 is connected in signal communication with an input of a second entropy coder 1175. An output of the second entropy coder 1175 is available as an output of the encoder 1100 for an enhanced layer bitstream. The output of the second transformer/quantizer 1170 is further connected in signal communication with an input of a second inverse transformer/quantizer 1180. An output of the second inverse transformer/quantizer 1180 is connected in signal communication with a second non-inverting input of the third summing junction 1165.

The input to the video encoder 1100 is yet further connected in signal communication with a first input of a motion estimator 1185. An output of the motion estimator 1185 is connected in signal communication with a first input of a motion compensator 1190. An output of the motion compensator 1190 is connected in signal communication with an inverting input of the first summing junction 1105. A first output of a full resolution reference picture stores 1192 is connected in signal communication with a second input of the motion estimator 1185. A second output of the full resolution reference picture stores 1192 is connected in signal communication with a second input of the motion compensator 1190. An input of the full resolution reference picture stores 1192 is connected in signal communication with an output of a deblock filter 1195. An input of the deblock filter 1195 is connected in signal communication with an output of the switch 1191. Another input of the switch 1191 is connected in signal communication with an output of the third summing junction 1165.

The encoder 1100 attempts to optimize the full resolution video quality rather than the low resolution video quality. Motion estimation is performed on the full resolution video picture. After subtraction the motion compensated prediction from the input picture, the prediction residual is downsampled. Unlike in the RRU codec, the downsampling is applied to all pictures, so that the low resolution decoder can always have a picture to decode. The downsampled residual is transformed and quantized, and entropy coded. This forms the base layer bitstream. The inverse quantizer and inverse transform is applied, and then the coded residual is upsampled back to the full resolution. The encoder 1100 can choose whether or not to send an enhancement layer full resolution error signal for the picture or slice. In general, an enhancement layer full resolution error signal is coded for all I slices, and can be optionally sent for P and B slices based on the magnitude of the error signal when the full resolution input picture subtracts the decoded upsampled. If an enhancement layer full resolution error signal is to be coded, the coded base layer upsampled coded picture is subtracted from the input full resolution picture. The difference is then quantized, transformed and entropy coded to form the enhancement layer bitstream. The enhancement layer bitstream can be seen as containing only intra-coded slices.

Figure 8:
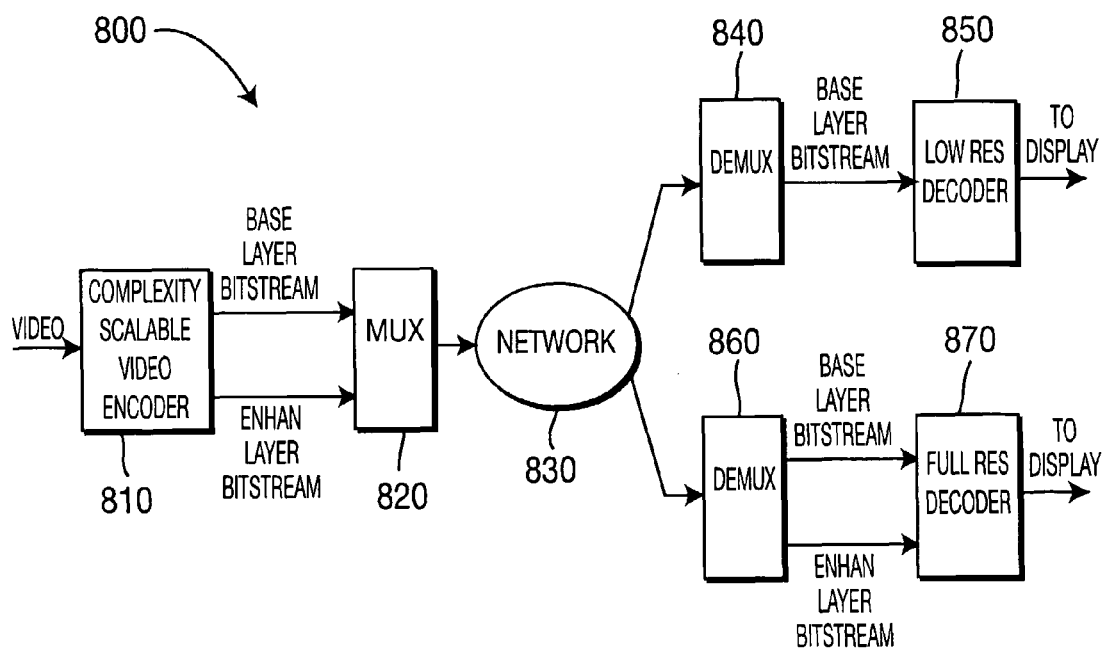
FIG. 8 shows a block diagram for a complexity scalability broadcast system, according to the prior art.

In accordance with the principles of the present invention, a new complexity scalable video encoder and decoder are described. In contrast to the prior art approach shown and described with respect to FIG. 8, which uses RRU for all type of slices, in the present invention, RRU is used in the base layer for inter-pictures (P and B) and the traditional spatial scalability approach is used for intra-pictures (I). Thus, for inter-pictures, the base layer can be decoded into both a low resolution or a full resolution sequence, based on the complexity level of the decoder. That is, the bits used for coding the video residual formed after motion estimation/compensation are used in both the low resolution decoder and the full resolution decoder. The motion vectors transmitted in the base layer bitstream are used in both the low resolution decoder and the full resolution decoder, but with a higher accuracy in the full resolution decoder than in the low resolution decoder. Also, the motion compensation prediction is done at a low resolution in the low resolution decoder and at a high resolution in the high resolution decoder. Low resolution frame stores are used in a low resolution decoder, and high resolution frame stores in the high resolution decoder. An enhancement layer is only sent when I pictures are present in the base layer.

The decoder complexity of the low resolution decoder is kept low, because all decoding operations are performed at the low resolution (inverse quantization/transform, motion compensation, deblocking). However, the bitrate of the base layer bitstream tends to be high as compared to a simulcast or spatial scalable bitstream, which impacts the entropy decoder complexity. If the enhancement layer is constrained to be present only for I pictures in the base layer, then the complexity of the full resolution decoder is less than a typical spatial scalability decoder, since for non-I pictures decoding of only a single layer is necessary.

I frames are coded using a traditional spatial scalable approach as in H.263. The I frame in the base layer is coded as low resolution using the H.264 intra coding approach. For the enhancement layer of base layer I frames, the approach in H.263 is used by incorporating the new features of H.264. The enhancement layer picture can be predicted from an upsampled temporally simultaneous base layer reference picture and the prior base layer full resolution reference pictures. The upsampling can be performed with the 6-tap interpolation filter {1,−5,20,20,−5,1}/32, which is defined in H.264 for the purpose of half-sample interpolation, or some other bilinear filters. The picture in enhancement layer is referred as EI if it is predicted from its corresponding upsampled based layer reference I picture, EP if it is predicted from both the upsampled reference I picture and the prior base layer full resolution reference picture with single prediction, and EB if it is predicted from both the upsampled reference I picture and the prior base layer full resolution reference picture with bi-prediction. The EI picture is coded using I-slice syntax in H.264. That is, EI is first formed as the residue of the full resolution picture and its corresponding upsampled based layer reference picture by assuming the motion vector is zero. Then, the residue is coded exactly as an I picture. To be more specific, the current macroblock and neighboring macroblock residuals from the (upsampled) reconstructed base layer are adjusted by adding 128 and clipping to (0, 255), and then used for spatial intra prediction, e.g., as specified in sub clause 8.3 of the Advanced Video Coding Standard (AVC). A subtraction of 128 and clipping to (−256, 255) is then performed. The inter-layer intra predicted residue is then added on the (upsampled) reconstructed base layer to form the reconstructed enhancement layer macroblock. An alternative way to code EI is to code the residue picture without any spatial prediction as, e.g., in MPEG-2/MPEG-4/H.263. When the enhancement layer picture is coded EP, both the upsampled based layer reference picture and its prior base layer full resolution reference pictures are put in the reference picture list 0. After EP is coded, the upsampled based layer reference picture can be removed from the reference picture buffer. EP is coded using P-slice syntax in H.264. When the enhancement layer picture is coded EB, both the upsampled based layer reference picture and its prior base layer full resolution reference pictures are put in the reference picture list 0 and reference picture list 1. The default order of the first two pictures in the reference picture list 1 should be different from that of the reference picture list 0. After EB is coded, the upsampled based layer reference picture can be removed from reference picture buffer. EB is coded using B-slice syntax in H.264. Another way is on a macroblock basis, which combines how MB is coded in EI, EP and EB on a macroblock adaptive basis. That is, a macroblock can be coded using spatial intra prediction for enhancement layer residue from an upsampled reconstructed base layer, or a macroblock can be coded as an intra-MB, or as single prediction or bi-prediction from reference pictures.

Figure 12:
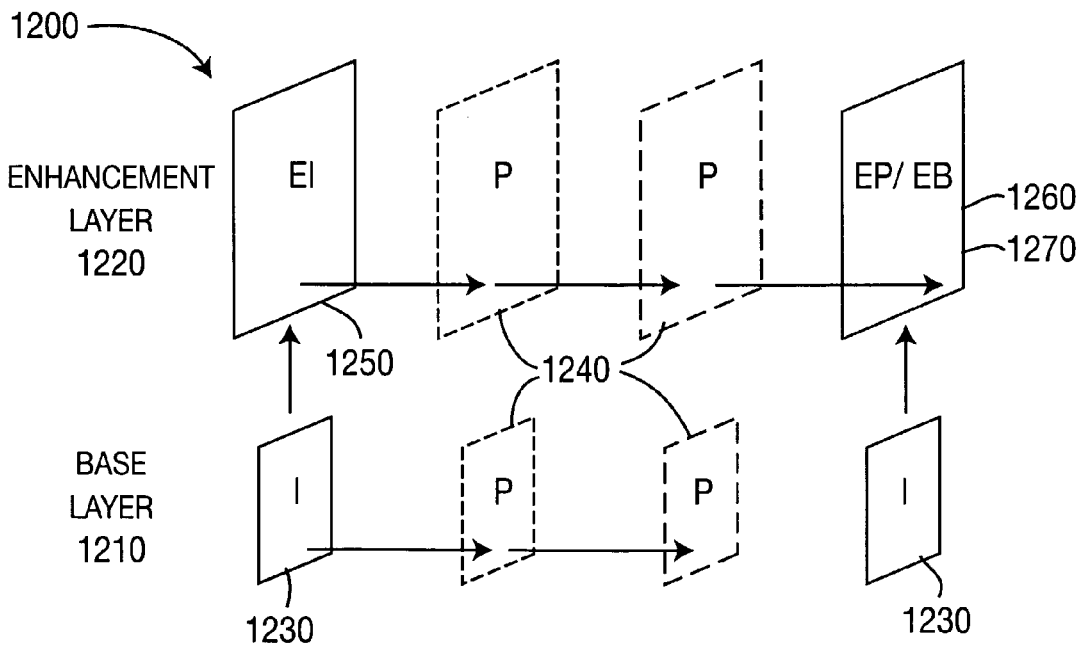
FIG. 12 shows a diagram for complexity scalability in accordance with the principles of the present invention.

Turning to FIG. 12, complexity scalability in accordance with the principles of the present invention is indicated generally by the reference numeral 1200. The complexity scalability 1200 involves a base layer 1210 and an enhancement layer 1220. The picture types involved include I pictures 1230, P pictures 1240, EI pictures 1250, EP pictures 1260, and EB pictures 1270. The P pictures 1240 in both layers are both decoded from the same bitstream but with different decoding techniques.

Figure 13:
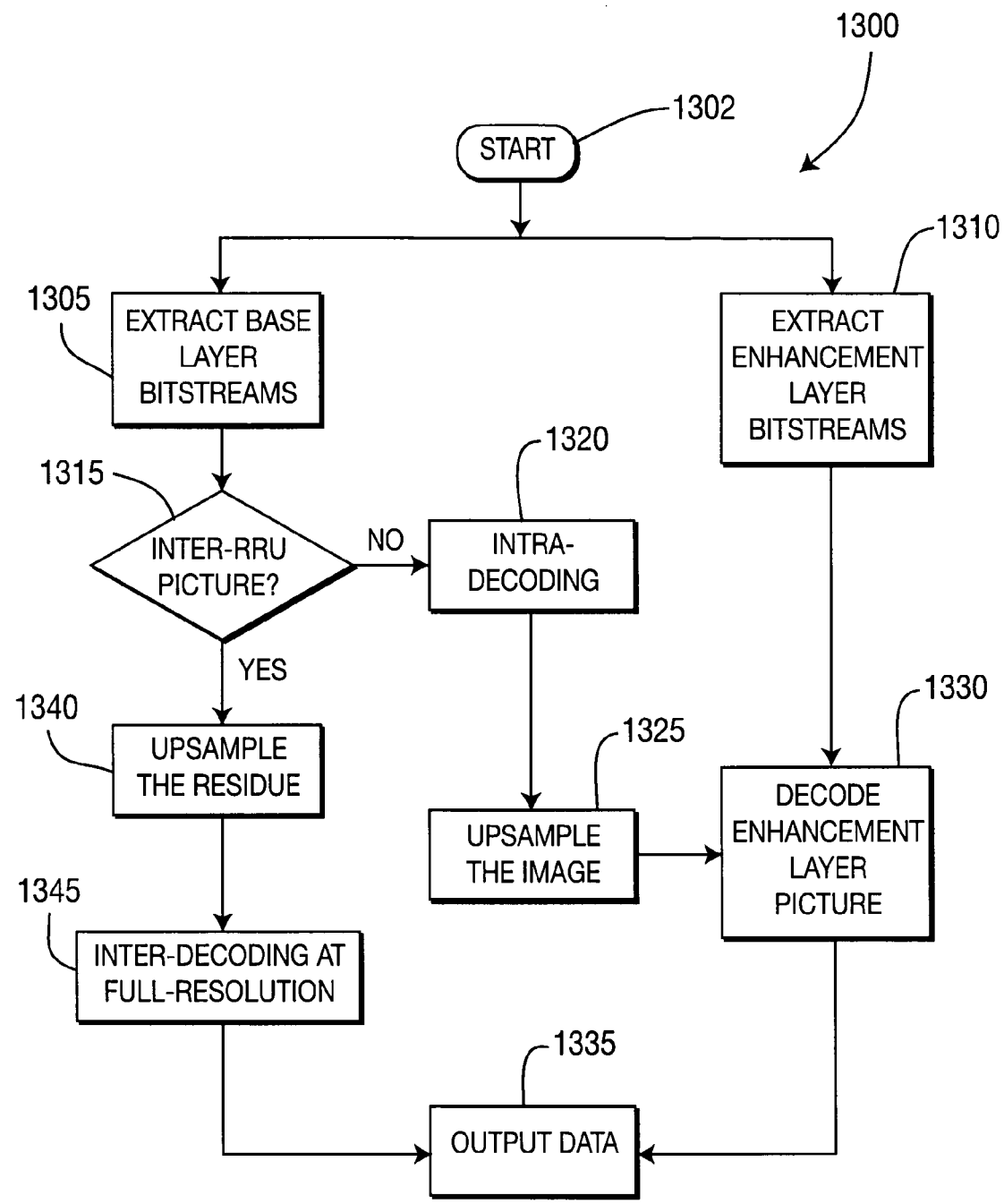
FIG. 13 shows a flow diagram for a method for decoding video data in full resolution in accordance with the principles of the present invention.

Turning to FIG. 13, a method for decoding video data for a picture in full resolution is indicated generally by the reference numeral 1300.

A start block 1302 passes control to a function block 1305 and a function block 1310. The function block 1310 extracts enhancement layer bitstreams, and passes control to a function block 1330. The function block 1330 decodes the enhancement layer picture, and passes control to an end block 1335.

The function block 1305 extracts base layer bitstreams, and passes control to a decision block 1315. The decision block 1315 determines whether or not the current picture is an INTER-RRU (encoded) picture. If the current picture is not an INTER-RRU picture, then control is passed to a function block 1320. Otherwise, if the current picture is an INTER-RRU picture, then control is passed to a function block 1340.

The function block 1320 INTRA decodes the current picture, and passes control to a function block 1325. The function block 1325 upsamples the current picture, and passes control to function block 1330.

The function block 1340 upsamples the residue of the current picture, and passes control to a function block 1345. The function block 1345 INTER decodes the current picture at full-resolution, and passes control to end block 1335.

The method 1300 of FIG. 13 may be implemented, e.g., by the decoder 1000 of FIG. 10. The portion of the decoder 1000 that operates on the base layer bitstream for inter-pictures is an RRU decoder. After entropy decoding 1005 and inverse quantization and inverse transform 1010, the residual is upsampled 1015. Motion compensation 1035 is applied to the full resolution reference pictures to form a full resolution prediction, and the upsampled residual is added 1020 to the prediction. For the intra pictures, the base layer decoder is a standard H.264 decoder operated in low resolution. The deblocking filter 1050 is optional. The deblocking filter 1050 can be inserted before upsampling or after upsampling. The upsampled reconstructed base layer picture is put into the reference picture buffer 1030 for prediction. The enhancement layer decoder 1040 is a standard H.264 decoder operated in full resolution. If an El picture is input to decoder 1300, then the generated residue picture will be added on the upsampled reference picture, followed by deblocking. If an EP picture is input to decoder 1300, then no additional step is needed.

In general, EP/EB can be more efficiently coded than El. However, for some applications, like channel change or other trick modes, El has to be used for fast accessing. Nevertheless, since an I picture is always available in the base layer, the frequency of El pictures in the enhancement layer can be reduced by allowing some drift in full resolution immediately following a channel change. That is, when a channel change happens and the enhancement layer picture is EP/EB, the upsampled base layer reference picture will be used as the reference picture for the prediction of the following pictures. To limit the drift, IDR-like constraints can be used for the following inter-pictures, i.e., the following inter-pictures cannot predict from the pictures prior to the I picture. The drift will be fully recovered until the next El picture.

Thus, the complexity scalable video encoder and decoder in accordance with the principles of the present invention are targeted on high coding efficiency for full resolution and allow constrained drift propagation for low resolution. The decoder complexities of the low resolution and full resolution decoders are very similar to those of non-scalable codecs, such as would be possible for simulcast. The low resolution decoder complexity is very similar to that of a non-scalable low resolution H.264/AVC decoder. The full resolution decoder complexity is very little changed from a standard H.264/AVC decoder for non-I pictures, with only the addition of a residual upsampler. An enhancement layer is decoded only for I-pictures and, thus, motion compensation is only performed once for a single picture, unlike typical spatial scalability decoders which require that two motion compensations be performed, one at each resolution, thus two frame stores.

Figures 14, 14A, 14B, 14C, 14D:
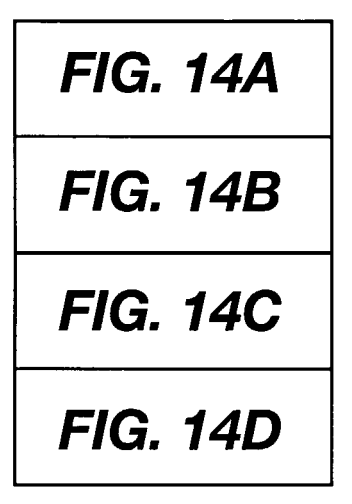

The complexity scalable video codec can be ported into and extended for H.264. A new slice parameter (reduced_resolution_update) is added according to which the current slice is subdivided into 32×32 size macroblocks and the size of the low-resolution picture is pic_width/2× pic_height/2. To support arbitrary low resolution horizontally or vertically at any ratio, two more parameters low_width_scale and low_height_scale may be added to allow the current slice to be subdivided into (low_width_scale*16)× (low_height_scale*16) size macroblock. The corresponding low resolution size is (pic_width/low_width_scale× pic_height/low_height_scale). Another parameter complexity_scalable_enable is added to indicate if the current slice will be coded as two layers. If the current slice is coded as the base layer, then the parameter enhancement_layer_flag is set to 0; otherwise it is set to 1. If the enhancement_layer_flag is set to 1, and slice_type is 1, then the enhancement layer is coded as El. If the enhancement_layer_flag is set to 1, and slice_type is P, then the enhancement layer is coded as EP. The size of low resolution is indicated by low_width_scale and low_height_scale. Turning to FIG. 14, a table for slice header syntax is indicated generally by the reference numeral 1400. Note that there are two tables for slice_header( ) examples. The first table can be used for any spatial resolution scalability. The second table presumes that the spatial scalability is two. In order for the low-resolution decoder to quickly bypass the enhancement layer, a new NAL unit type (Type 13) for enhancement layer is provided herein as shown in FIG. 15. Turning to FIG. 15, a table for NAL unit type codes is indicated generally by the reference numeral 1500.

Figure 16:
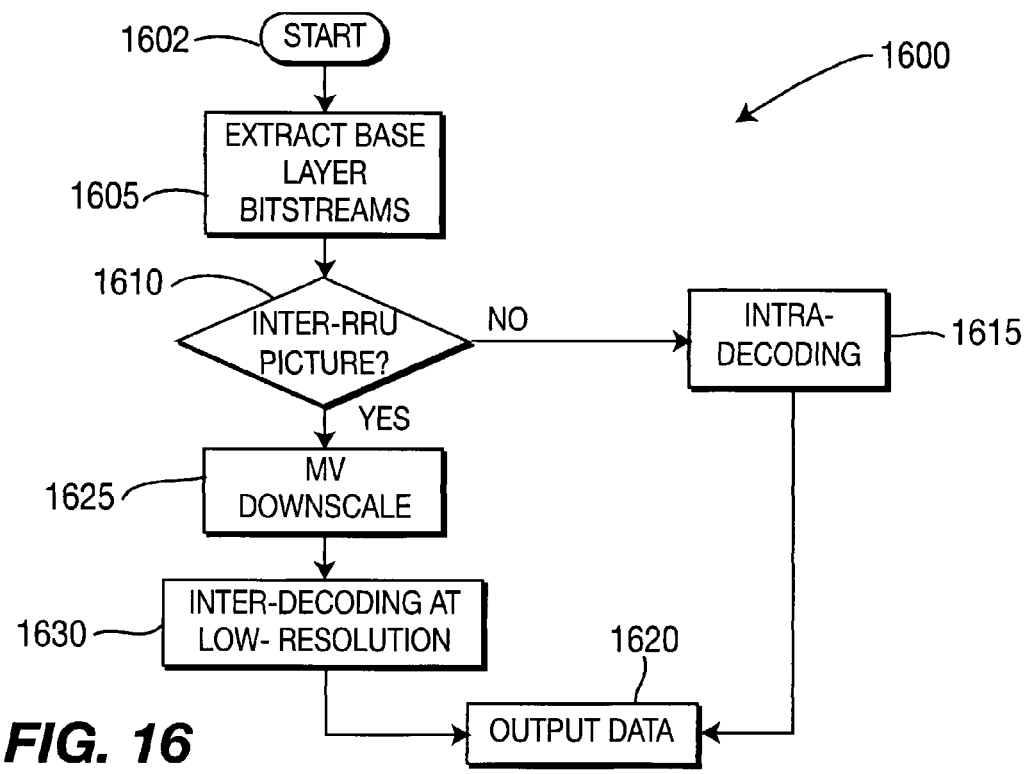
FIG. 16 shows a flow diagram for a method for decoding video data in low resolution in accordance with the principles of the present invention.

Turning to FIG. 16, a method for decoding video data for a picture at low resolution is indicated generally by the reference numeral 1600.

A start block 1602 passes control to a function block 1605. The function block 1605 extracts the base layer bitstreams, and passes control to a decision block 1610. The decision block 1610 determines whether or not the current picture is an INTER-RRU (encoded) picture. If the current picture is not an INTER-RRU picture, then control is passed to a function block 1615. Otherwise, if the current block is an INTER-RRU picture, then control is passed to a function block 1625.

The function block 1615 INTRA decodes the current picture, and passes control to an end block 1620.

The function block 1625 downscales the motion vectors of the current picture, and passes control to a function block 1630. The function block 1630 INTER decodes the current picture at low resolution, and passes control to end block 1620.

Figure 17:
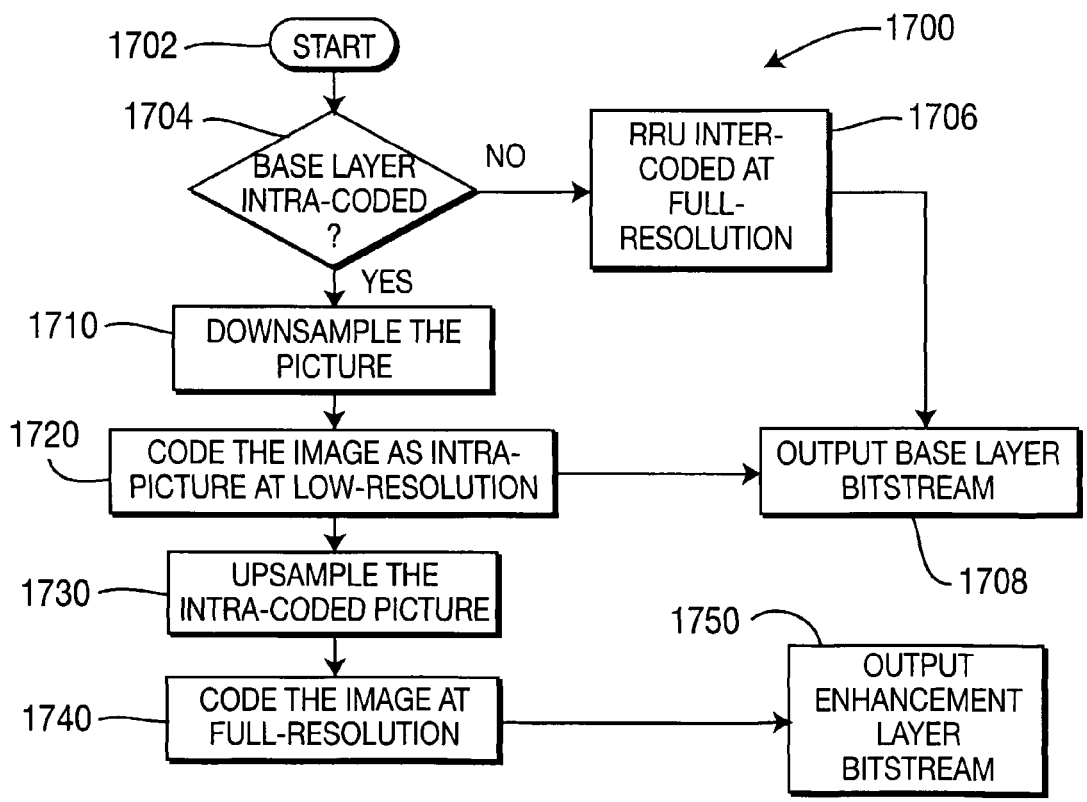
FIG. 17 shows a flow diagram for a method for encoding video data in accordance with the principles of the present invention.

Turning to FIG. 17, a method for encoding video data is indicated generally by the reference numeral 1700.

A start block 1702 passes control to a decision block 1704. The decision block 1704 determines whether or not the base layer is to be intra-coded. If the base layer is not to be intra-coded, then control is passed to a function block 1706. Otherwise, if the base layer is to be intra-coded, then control is passed to a function block 1710.

The function block 1706 RRU inter-codes the base layer at full resolution, and passes control to a function block 1708. The function block 1708 outputs the base layer bitstream.

The function block 1710 downsamples the picture in the base layer, and passes control to a function block 1720. The function block 1720 codes the picture as an intra picture at low resolution, and passes control to function block 1708 and to function block 1730.

The function block 1730 upsamples the intra-coded picture, and passes control to a function block 1740. The function block 1740 codes the picture at full resolution, and passes control to a function block 1750. The function block 1750 outputs the enhancement layer bitstream.

A description will now be given of some of the many attendant advantages/features of the present invention. For example, one advantage/feature is a scalable complexity video decoder for decoding a video bitstream that includes a base layer bitstream and an enhancement layer bitstream, wherein the decoder includes decoding means for decoding the base layer bitstream to form a full-resolution video sequence without the use of deblocking operations. Another advantage/feature is a scalable complexity video decoder that outputs a full resolution video sequence and that uses a deblock filter before or after an upsampling process. Yet another advantage/feature is a scalable complexity video decoder that outputs a full resolution video sequence and that has a reference picture stores that stores an upsampled based layer reference picture in addition to its prior base layer full resolution reference pictures. Still another advantage/feature is scalable complexity video encoder that uses layered coding techniques for intra pictures and RRU techniques for inter pictures. Moreover, another advantage/feature is a scalable complexity video encoder as described above, wherein intra pictures have both a base layer and an enhancement layer and inter pictures only have a base layer. Further, another advantage/feature is a scalable complexity video encoder as described above, wherein for an intra picture, a corresponding enhancement layer can be coded using EI, EP and EB. Also, another advantage/feature is a scalable complexity video encoder as described above, wherein an EI picture is formed as the residue of the full resolution picture and its corresponding upsampled based layer reference picture by presuming the motion vector to be zero and coding using I-slice syntax. Yet another advantage/feature is a scalable complexity video encoder as described above wherein an enhancement layer for an intra picture can be coded using EI, EP and EB, and wherein both the upsampled based layer reference picture and its prior base layer full resolution reference pictures can be put in the reference picture list 0 for single prediction or reference list 0 and 1 for bi-prediction. Further, another advantage/feature is a scalable complexity video encoder as described above wherein an enhancement layer for an intra picture can be coded using EI, EP and EB, and wherein the enhancement layer is referred as EP and coded using P-slice syntax when single prediction is used. Moreover, another advantage/feature is a scalable complexity video encoder as described above wherein an enhancement layer for an intra picture can be coded using EI, EP and EB, and wherein the enhancement layer is referred as EB and coded using B-slice syntax when bi-prediction is used. Moreover, another advantage/feature is a scalable complexity video encoder as described above wherein an enhancement layer for an intra picture can be coded on macroblock basis, combining how MB is coded in EI, EP and EB on a macroblock adaptive basis.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A scalable complexity video decoder for decoding a video bitstream, comprising:
    means for performing inter-decoding at the base layer using a reduced resolution update mode;
    means for performing intra-decoding at the base layer using a non-reduced resolution mode;
    a first combiner for combining full resolution motion compensated predictions and decoded upsampled base layer residuals to form reconstructed upsampled base layer pictures for display without deblocking operations applied thereto;
    a second combiner, in signal communication with said first combiner, for combining the reconstructed upsampled base layer pictures with decoded enhancement layer residuals to form reconstructed full resolution enhancement layer pictures; and
    a deblocking filter, in signal communication with said second combiner, for performing deblocking operations on the reconstructed full resolution enhancement layer pictures.

2. A spatial scalable video decoder for decoding a video bitstream, comprising:
    means for applying a reduced resolution update approach in a base layer for inter-coded pictures;
    and means for applying a non-reduced resolution update approach for intra-coded pictures;
    an upsampler for performing an upsampling operation on a coded prediction residual corresponding to the video bitstream to form an upsampled prediction residual;
    and a deblocking filter being selectively insertable with respect to the upsampler to perform a deblocking operation any one of prior to and subsequent to the upsampling operation.

3. A spatial scalable video decoder for decoding a video bitstream, comprising:
    means for applying a reduced resolution update approach in a base layer for inter-coded pictures;
    and means for applying a non-reduced resolution update approach for intra-coded pictures;
    an upsampler for upsampling a base layer prediction residual to form an upsampled base layer prediction residual;
    and a reference picture store for storing an upsampled base layer reference picture formed from the upsampled base layer prediction residual along with corresponding prior full resolution reference pictures, wherein said decoder provides a decoded output from the video bitstream in a complete absence of any downsampling operations being performed.

4. A spatial scalable video encoder for encoding video signal data of a plurality of pictures, comprising:

intra coding means for performing intra coding at the base layer using a non-reduced resolution layered coding technique to form intra coded pictures;

and inter coding means for performing inter coding at the base layer using a Reduced-Resolution Update (RRU) technique to form inter coded pictures, wherein the inter coding means includes:

a downsampler for downsampling a prediction residual to form a downsampled low resolution prediction residual;

and a transformer/quantizer, in signal communication with said downsampler, for coding the downsampled low resolution prediction residual.

5. The spatial scalable video encoder according to claim 4, wherein the intra coded pictures are coded to have both a base layer and an enhancement layer, and inter coded pictures are coded to have only the base layer.

6. The spatial scalable video encoder according to claim 4, wherein for an intra coded base layer picture, an enhancement layer there for is coded such that one of an enhancement layer coded picture in the enhancement layer is predicted from a corresponding upsampled base layer reference picture, the enhancement layer coded picture is predicted from both the upsampled base layer reference picture and a prior base layer full resolution reference picture with single prediction, and the enhancement layer coded picture is predicted from both the upsampled base layer reference picture and the prior base layer full resolution reference picture with bi-prediction.

7. The spatial scalable video encoder according to claim 6, wherein the enhancement layer coded picture predicted from the corresponding upsampled base layer reference picture is formed as a residue of a current original full resolution picture and the corresponding upsampled base layer reference picture by considering a corresponding motion vector to be zero and coded using I-slice syntax.

8. The spatial scalable video encoder according to claim 6, further comprising means for placing both the upsampled base layer reference picture and the prior base layer full resolution reference picture in a reference picture list 0 for single prediction or in a reference picture list 1 for bi-prediction.

9. The spatial scalable video encoder according to claim 6, wherein the enhancement layer coded picture is predicted from both the upsampled base layer reference picture and the prior base layer full resolution reference picture with single prediction using P-slice syntax.

10. The spatial scalable video encoder according to claim 6, wherein the enhancement layer coded picture is predicted from both the upsampled base layer reference picture and the prior base layer full resolution reference picture with bi-prediction using B-slice syntax.

11. A scalable complexity method for decoding a video bitstream, comprising the steps of:

performing inter-decoding at the base layer using a reduced resolution update mode;

performing intra-decoding at the base layer using a non-reduced resolution mode;

combining full resolution motion compensated predictions and decoded upsampled base layer residuals to form reconstructed upsampled base layer pictures for display without any deblocking operations applied thereto;

combining the reconstructed upsampled base layer pictures with decoded enhancement layer residuals to form reconstructed full resolution enhancement layer pictures; and performing deblocking operations on only the reconstructed full resolution enhancement layer pictures to output filtered reconstructed full resolution enhancement layer pictures for display.

12. A spatial scalable method for decoding a video bitstream, comprising the steps of:

performing inter-decoding at the base layer using a reduced resolution update mode:

and performing intra-decoding at the base layer using a non-reduced resolution mode;

performing, using an upsampler, an upsampling operation on a coded prediction residual corresponding to the video bitstream to form an upsampled prediction residual;

and selectively inserting a deblocking filter with respect to the upsampler to perform a deblocking operation any one of prior to and subsequent to the upsampling operation.

13. A spatial scalable method for decoding a video bitstream, comprising the steps of:

performing inter-decoding at the base layer using a reduced resolution update mode:

and performing intra-decoding at the base layer using a non-reduced resolution mode:

upsampling a base layer prediction residual to form an upsampled base layer prediction residual;

and storing an upsampled base layer reference picture formed from the upsampled base layer prediction residual along with corresponding prior full resolution reference pictures, wherein said method provides a decoded output from the video bitstream in a complete absence of any downsampling operations being performed.

14. A spatial scalable method for encoding video signal data of a plurality of pictures, comprising the steps of:

performing intra coding at the base layer using a non-reduced resolution layered coding technique to form intra coded pictures;

and performing inter coding at the base layer using a Reduced-Resolution Update (RRU) technique to form inter coded pictures, wherein said inter coding step includes:

downsampling a prediction residual to form a downsampled low resolution prediction residual;

and coding the downsampled low resolution prediction residual.

15. The method according to claim 14, wherein the intra coded pictures are coded to have both a base layer and an enhancement layer, and inter coded pictures are coded to have only the base layer.

16. The method according to claim 14, wherein for an intra coded base layer picture, an enhancement layer there for is coded such that one of an enhancement layer coded picture in the enhancement layer is predicted from a corresponding upsampled base layer reference picture, the enhancement layer coded picture is predicted from both the upsampled base layer reference picture and a prior base layer full resolution reference picture with single prediction, and the enhancement layer coded picture is predicted from both the upsampled base layer reference picture and the prior base layer full resolution reference picture with bi-prediction.

17. The method according to claim 16, wherein the enhancement layer coded picture predicted from the corresponding upsampled base layer reference picture is formed as a residue of a current original full resolution picture and the corresponding upsampled base layer reference picture by considering a corresponding motion vector to be zero and coded using I-slice syntax.

18. The method according to claim 16, further comprising the step of placing both the upsampled base layer reference picture and the prior base layer full resolution reference picture in a reference picture list 0 for single prediction or in a reference picture list 1 for bi-prediction.

19. The method according to claim 16, wherein the enhancement layer coded picture is predicted from both the upsampled base layer reference picture and the prior base layer full resolution reference picture with single prediction using P-slice syntax.

20. The method according to claim 16, wherein the enhancement layer coded picture is predicted from both the upsampled base layer reference picture and the prior base layer full resolution reference picture with bi-prediction using B-slice syntax.

\* \* \* \* \*